(12) United States Patent
Oh et al.

(10) Patent No.: US 10,902,457 B2
(45) Date of Patent: *Jan. 26, 2021

(54) METHOD AND APPARATUS FOR PROVIDING MISSION SERVICE BASED ON USER LIFE LOG IN WIRELESS COMMUNICATION SYSTEM

(71) Applicant: SAMSUNG ELECTRONICS CO., LTD., Suwon-si (KR)

(72) Inventors: Joon-seop Oh, Paju-si (KR); Seung-Hyun Baek, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,176

(22) Filed: Aug. 1, 2018

(65) Prior Publication Data

US 2018/0341976 A1 Nov. 29, 2018

Related U.S. Application Data

(63) Continuation of application No. 14/685,058, filed on Apr. 13, 2015, now Pat. No. 10,062,087, which is a
(Continued)

(30) Foreign Application Priority Data

Oct. 28, 2010 (KR) .................. 10-2010-0105769

(51) Int. Cl.
*G06Q 30/02* (2012.01)
*G06Q 10/00* (2012.01)
*G06Q 10/06* (2012.01)

(52) U.S. Cl.
CPC ......... *G06Q 30/0242* (2013.01); *G06Q 30/02* (2013.01); *G06Q 30/0269* (2013.01); *G06Q 30/0273* (2013.01)

(58) Field of Classification Search
CPC .......... G06Q 30/0242; G06Q 30/0269; G06Q 30/0273
(Continued)

(56) References Cited

U.S. PATENT DOCUMENTS 7,065,536 B2 6/2006 Bachman et al.
7,127,736 B2 10/2006 Kondo et al.
(Continued)

FOREIGN PATENT DOCUMENTS

JP 2000076354 A 3/2000
JP 2010206702 A 9/2010
(Continued)

OTHER PUBLICATIONS

"Location-based Mobile Games"—Lorenz Lehmann, TU Berlin, May 2009 https://pdfs.semanticscholar.org/aed4/28f1c3d70edcc9e990fde5af60f6178b9656.pdf (Year: 2009).*
(Continued)

*Primary Examiner* — Randy A Scott
(74) *Attorney, Agent, or Firm* — Sughrue Mion, PLLC (57) ABSTRACT

An electronic device includes a sensor; a transceiver; a display; and a processor to collect user log data including location information of the electronic device, control to transmit, through the transceiver, the user log data including the location information of the electronic device, to a log manage server, based on a user input, control to transmit, through the transceiver to the log manage server, a signal for using a mission service provided by the log manage server, receive, through the transceiver from the log manage server, a mission based on the location information of the electronic device, control to display, on the display, information of the received mission, control to detect, through the sensory data associated with performing the mission, and control to transmit, through the transceiver, the sensory data to the log
(Continued)

manage server to determine whether a result of performing the mission is successful.

22 Claims, 6 Drawing Sheets

Related U.S. Application Data continuation of application No. 13/283,322, filed on Oct. 27, 2011, now Pat. No. 9,009,300.

(58) Field of Classification Search
USPC ...... 709/207, 208, 222, 224; 705/7.13, 7.14, 705/7.26
See application file for complete search history.

(56) References Cited

U.S. PATENT DOCUMENTS

| | | | |
|---|---|---|---|
| 7,818,317 B1* | 10/2010 | Emigh | H04L 67/18 707/724 |
| 7,861,253 B1 | 12/2010 | Lettington et al. | |
| 7,945,470 B1* | 5/2011 | Cohen | G06Q 10/06 705/7.13 |
| 8,280,400 B1* | 10/2012 | Morley | H04M 1/72572 455/456.1 |
| 8,732,246 B2 | 5/2014 | Jayanthi | |
| 2001/0011295 A1 | 8/2001 | Kobayashi et al. | |
| 2002/0147693 A1 | 10/2002 | Banerjee et al. | |
| 2004/0247748 A1 | 12/2004 | Bronkema | |
| 2006/0059028 A1 | 3/2006 | Eder | |
| 2006/0258375 A1 | 11/2006 | Wilbrink et al. | |
| 2007/0015521 A1* | 1/2007 | Casey | G01C 21/343 455/456.3 |
| 2008/0183490 A1 | 7/2008 | Martin et al. | |
| 2009/0210148 A1* | 8/2009 | Jayanthi | G01C 21/26 701/467 |
| 2009/0228519 A1 | 9/2009 | Purcell et al. | |
| 2010/0121744 A1 | 5/2010 | Belz et al. | |
| 2010/0223212 A1* | 9/2010 | Manolescu | G06Q 10/06 706/12 |
| 2010/0331089 A1 | 12/2010 | Priebatsch et al. | |

FOREIGN PATENT DOCUMENTS

| | | |
|---|---|---|
| KR | 20060019320 A | 3/2006 |
| KR | 20090116584 A | 11/2009 |
| KR | 20100063965 A | 6/2010 |

OTHER PUBLICATIONS

"A Mission Support Tool for Health and Human Services"—SBC, Apr. 2009; http://www.att.com/Common/files/pdf/npower_health_and_human_services.pdf.
Communication dated Jun. 20, 2016, issued by the Korean Intellectual Property Office in corresponding Korean Application No. 10-2010-0105769.
Notice of Patent Grant dated Dec. 26, 2016, by the Korean Intellectual Property Office in counterpart Korean Application No. 10-2010-0105769.
"Location-based Mobile Games"—Lorenz Lehmann, TU Berlin, Aug. 2010 https://www.snet.tu-berlin.de/fileadmin/fg220/courses/WS1112/snet-project/location-based-mobile-games_lehmann.pdf.
Non Final Office Action dated Aug. 23, 2017 from U.S. Patent & Trademark Office in related U.S. Appl. No. 14/685,058.
Non Final Office Action dated Dec. 9, 2016 from U.S. Patent & Trademark Office in related U.S. Appl. No. 14/685,058.
Final Office Action dated Dec. 26, 2017 from U.S. Patent & Trademark Office in related U.S. Appl. No. 14/685,058.
Final Office Action dated May 1, 2017 from U.S. Patent & Trademark Office in related U.S. Appl. No. 14/685,058.
Final Office Action dated Aug. 1, 2016 from U.S. Patent & Trademark Office in related U.S. Appl. No. 14/685,058.
Notice of Allowance dated Apr. 26, 2018 from U.S. Patent & Trademark Office in related U.S. Appl. No. 14/685,058.
Non Final Office Action dated Mar. 28, 2016 from U.S. Patent & Trademark Office in related U.S. Appl. No. 14/685,058.
Notice of Allowance dated Dec. 9, 2014 from U.S. Patent & Trademark Office in related U.S. Appl. No. 13/283,322.
Non Final Office Action dated Aug. 25, 2014 from U.S. Patent & Trademark Office in related U.S. Appl. No. 13/283,322.
Non Final Office Action dated Aug. 22, 2013 from U.S. Patent & Trademark Office in related U.S. Appl. No. 13/283,322.
Final Office Action dated Jan. 6, 2014 from U.S. Patent & Trademark Office in related U.S. Appl. No. 13/283,322.

* cited by examiner

METHOD AND APPARATUS FOR PROVIDING MISSION SERVICE BASED ON USER LIFE LOG IN WIRELESS COMMUNICATION SYSTEM

CROSS-REFERENCE TO RELATED APPLICATIONS

This application is a Continuation Application of U.S. application Ser. No. 14/685,058 filed Apr. 13, 2015, which is a continuation of U.S. application Ser. No. 13/283,322 filed Oct. 27, 2011, which is based on and claims priority under 35 U.S.C. § 119 to Korean Patent Application No. 10-2010-0105769 filed on Oct. 28, 2010, in the Korean Intellectual Property Office. The disclosures of the above-named applications are incorporated by reference herein in their entireties.

TECHNICAL FIELD OF THE INVENTION

The present invention relates to a wireless communication system. More particularly, the present invention relates to a method and an apparatus for providing a customized service based on a user's life log.

BACKGROUND OF THE INVENTION

Recently, as a computing environment and a communication technology develop, a study for recording a user's personal information on an electronic device and providing various services utilizing the user's personal information is in active progress. For example, a study for detecting all information occurring in a user's everyday life, that is, user life log data via an electronic device to record the same on the electronic device, and providing a service suitable for the user using the life log is in progress. For example, a service for collecting life log data related to a moving image, voice, electronic mail (e-mail), telephone communication, and a message using an electronic device, searching for information suitable for a user based on the collected life log data, and then providing the searched information may be used.

However, the above-described life log-based service is limited to simply searching for information corresponding to collected life log data and showing the information. Therefore, a service that utilizes the life log data more effectively needs to be provided.

SUMMARY OF THE INVENTION

To address the above-discussed deficiencies of the prior art, it is a primary object to provide some, none, or all of the advantages described below. Accordingly, an aspect of the present disclosure is to provide a method and an apparatus for providing a customized service based on a user's life log in a wireless communication system.

Another aspect of the present disclosure is to provide a method and an apparatus for providing a behavior targeting advertisement service based on a user's life log in a wireless communication system.

Still another aspect of the present disclosure is to provide a method and an apparatus for registering mission for each company in advance and providing a mission suitable for a user based on user life log data in a wireless communication system.

In accordance with an aspect of the present disclosure, a method of a terminal for providing a customized service based on a user life log in a wireless communication system is provided. The method collects user data existing inside a terminal. The method transmits the user data to a log manage server. The method receives a mission determined based on user data from the log manage server. The method transmits performance results regarding the mission to the log manage server.

In accordance with another aspect of the present disclosure, a method of a server for providing a customized service based on a user life log in a wireless communication system is provided. The method collects user data from a terminal. The method determines a mission corresponding to the user data from a plurality of missions registered in advance. The method transmits the mission to the terminal. The method receives a performance result of the mission.

In accordance with further another aspect of the present disclosure, an apparatus of a terminal for providing a customized service based on a user life log in a wireless communication system is provided. A log collector is configured to collect user data existing inside a terminal. A transceiver is configured to transmit the user data to a log manage server and receive a mission determined based on the user data from the log manage server. A mission performance manager is configured to provide a performance result regarding the mission to the log manage server via the transceiver.

In accordance with yet another aspect of the present disclosure, an apparatus of a server for providing a customized service based on a user life log in a wireless communication system is provided. A log collector is configured to collect user data from a terminal. A mission determination unit is configured to determine a mission corresponding to the user data from a plurality of missions registered in advance. A transceiver is configured to transmit the mission to the terminal and receive a performance result regarding the mission.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

FIGS. 1 to 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification Exemplary embodiments of the present disclosure provide an apparatus and a method for providing a behavior targeting advertisement service based on a user life log in a wireless communication system.

Figure 1:
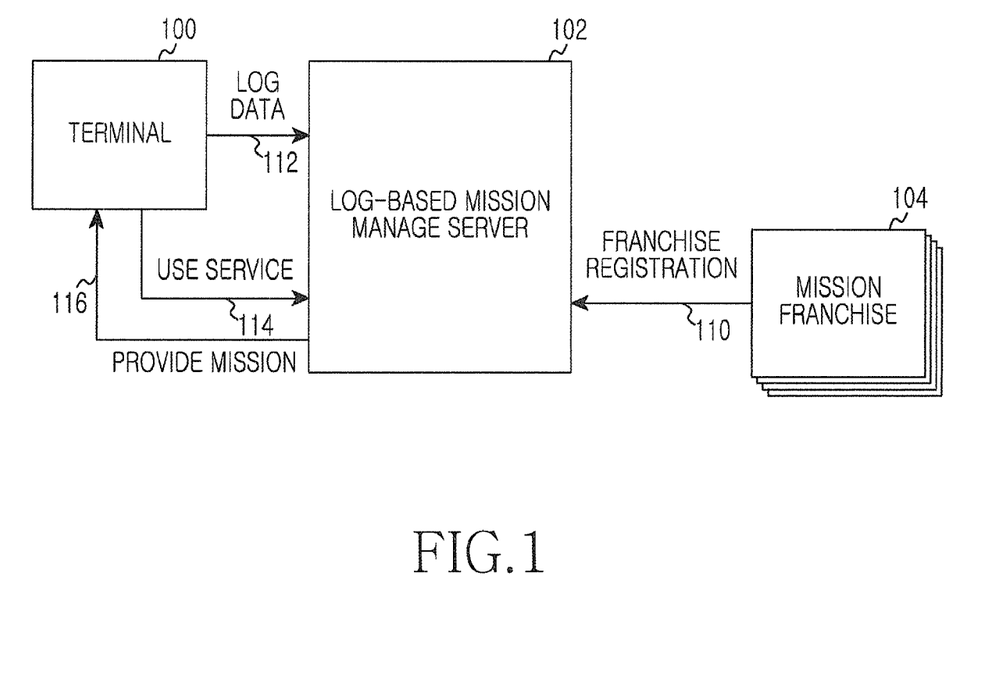
FIG. 1 is a block diagram illustrating a wireless communication system for providing a customized service based on a user log according to an embodiment of the present disclosure.

FIG. 1 is a block diagram illustrating a wireless communication system for providing a customized service based on a user log according to an embodiment of the present disclosure.

Referring to FIG. 1, the wireless communication system includes a terminal 100, a log-based mission manage server 102, and a mission franchise 104. Here, the terminal denotes all devices such as a mobile terminal, a Personal Computer (PC), a Television (TV), etc. where a user log may occur.

The mission franchise 104 may be a company having a purpose of pursuing a profit such as a product promotion and sales, enterprise image improvement, etc., and may be an individual having a specific purpose, a public organization, or various organizations. The mission franchise 104 registers itself in the log-based mission manage server 102 as a franchise, and registers information regarding benefit (for compensation) (for example, a discount coupon, a free coupon, point accumulation, etc.) that may be provided to each user in operation 110. At this point, the mission franchise 104 may register various missions in the log-based mission manage server 102, and register a benefit that is provided upon completion of a relevant mission for each mission. Here, the mission may be a function that has to be performed via the terminal 100, or may be a behavior that a user of the terminal 100 has to perform in person. For example, the mission may be visiting a specific Internet site, viewing a specific image via the terminal 100, or allow a user of the terminal 100 to visit a specific place in person. Of course, the mission is not limited to the above examples, but may change variously within the scope of the present disclosure without departing from the spirit of the present disclosure.

The terminal 100 detects and collects all information that occurs in a user's everyday life, that is, user life log data (referred to as 'user log data' hereinafter), and provides the collected all information to the log-based mission manage server 102 in operation 112. At this point, the terminal 100 may collect user log data and provide the collected user log data to the log-based mission manage server 102 every predetermined period.

In addition, the terminal 100 transmits a signal representing that a log-based customized service is used to the log-based mission manage server 102 according to a user's request in operation 114. That is, the user of the terminal 100 performs a mission suitable for the user's everyday life. When the user desires to receive a benefit regarding mission performance, the user may set that the user will use a log-based customized service by touching a screen or inputting a key of the terminal 100. When the log-based customized service is set, the terminal 100 may transmit a signal representing this setting to the log-based mission manage server 102.

When the mission franchise 104 is registered, the log-based mission manage server 102 stores various missions and benefits for each mission related to the mission franchise 104. Of course, the mission may be requested by the mission franchise 104, or the log-based mission manage server 102 may analyze the characteristics of the mission franchise 104 to automatically generate the mission. At this point, the log-based mission manage server 102 may map user log data corresponding to each mission and store the same. At this point, the mapped user log data is general data obtained from a plurality of user log data. The mapped user log data may be registered upon system designing and may be updated based on user log data collected afterward.

In addition, the log-based mission manage server 102 collects and stores user log data of the terminal 100. When receiving a signal representing that a log-based customized service is used from the terminal 100, the log-based mission manage server 102 analyzes the user log data collected from the terminal 100, and then determines a mission corresponding to the analysis results among missions stored in advance. The log-based mission manage server 102 provides the determined mission to the terminal 100 in operation 116.

Then, the terminal 100 may perform the mission provided from the log-based mission manage server 102 under control of the user, and transmit mission performance results to the log-based mission manage server 102. For example, when the provided mission is visiting a specific place, when the user of the terminal 100 visits the specific place, the terminal may transmit current location information to the log-based mission manage server 102. The log-based mission manage server 102 determines whether the terminal 100 has succeeded in performing the mission through mission performance results received from the terminal 100. When the terminal has succeeded in performing the mission, the log-based mission manage server 102 provides a benefit corresponding to the relevant mission to the terminal 100. Here, to determine whether the terminal has succeeded in performing the mission, the log-based mission manage server 102 stores a mission performance result value for each mission together or a mission performance result determination algorithm when registering the mission.

Figure 2:
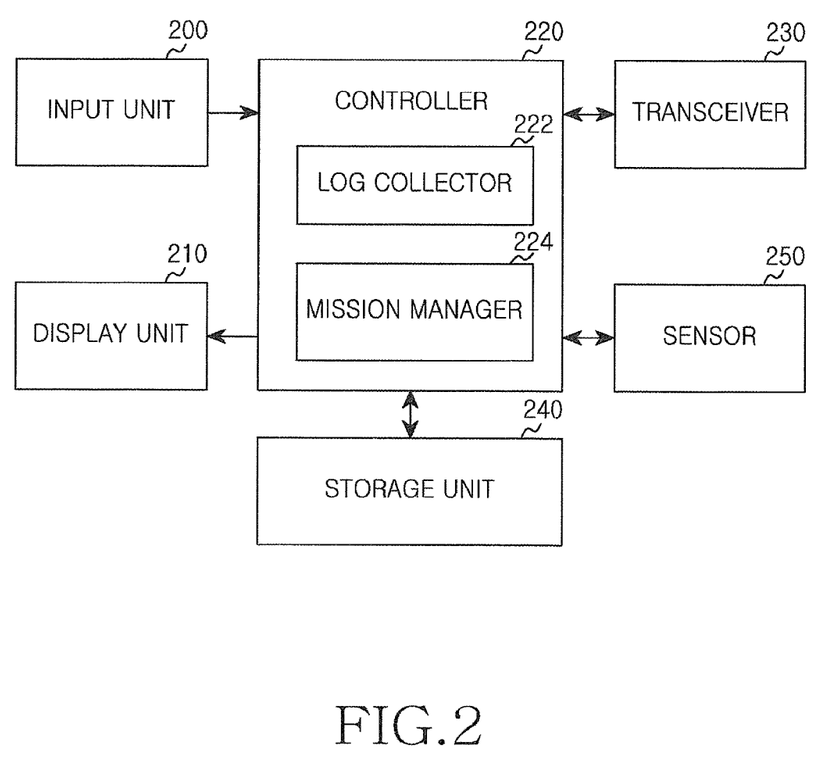
FIG. 2 is a block diagram illustrating a terminal according to an embodiment of the present disclosure.

FIG. 2 is a block diagram illustrating a terminal according to an embodiment of the present disclosure.

Referring to FIG. 2, the terminal includes an input unit 200, a display unit 210, a controller 220, a transceiver 230, a storage unit 240, and a sensor 250. More particularly, the controller 220 includes a log collector 222 and a mission manager 224.

The input unit 200 includes at least one key or touch sensor, and provides data input by a user to the controller 220. That is, the input unit 200 provides data corresponding to a key pressed by the user to the controller 220 or provides data corresponding to a coordinate touched by the user to the controller 220. More particularly, the input unit 200 provides a signal representing a log-based customized service is used to the controller 220 according to the user's key manipulation or touch operation.

The display unit 210 displays various status information, numbers, characters, and images that occur during operation of the terminal. More particularly, the display unit 210 may display a mission provided from the log-based mission manage server, mission performance results, whether a mission is successful, and a benefit corresponding to a mission success.

The controller 220 performs controls and processes for an overall operation of the terminal. More particularly, the controller 220 includes a log collector 222 and a mission manager 224 to collect various user log data that occur during a user's everyday life and transmit the collected various user log data to the log-based mission manage server. When a mission is provided from the log-based mission manage server, the controller 220 transmits the mission performance results to the log-based mission manage server to control and process a function for receiving a benefit corresponding to the mission performance results.

In other words, the log collector 222 collects various user log data that occur during the user's everyday life every predetermined period. At this point, the log collector 222 collects data stored in the storage unit 240 and data detected via a sensor 250. For example, the various user log data may be all data that occur in the terminal such as photo/moving image related data, Personal Information Management System (PIMS) data, a contents use history, a voice memo, a text memo, location and time information, Social Networking System (SNS) related data, an E-mail/Internet use history, an electronic device use history, a communication record, a message record, etc.

In addition, when a mission is provided from the log-based mission manage server 102, the mission manager 224 controls and processes a function for displaying the provided mission and a benefit regarding the mission on the display unit 210, and automatically detects completion of the mission or manually detects the completion of the mission under control of the user to control and process a function for transmitting performance results of the mission to the log-based mission manage server. In addition, when a message representing whether the mission is successful is received from the log-based mission manage server, the mission manager 224 may display whether the mission is successful on the display unit 210. At this point, when the mission is successful, the mission manager 224 receives benefit information regarding mission success from the log-based mission manage server to control and process a function for providing the received benefit information to the user via the display unit 210.

The transceiver 230 processes a signal transmitted and received to and from a different apparatus under control of the controller 220. More particularly, according to an embodiment of the present disclosure, the transceiver 230 transmits and receives a signal to and from the log-based mission manage server 102.

The storage unit 240 stores various programs and data for the operation of the terminal, and stores various data that occur during the user's everyday life. For example, the storage unit 240 stores photo/moving image related data, PIMS data, a contents use history, a voice memo, a text memo, location and time information, SNS related data, an E-mail/Internet use history, an electronic device use history, a communication record, a message record, etc.

The sensor 250 serves as a sensor for detecting the user's neighboring environment, and may obtain at least one of visual information, auditory information of the user's neighborhood, and information regarding the user's behavior. For example, the sensor 250 includes at least one of sensors mountable on the terminal such as a camera sensor, a microphone sensor, an acceleration sensor, a proximity sensor, a direction sensor, a temperature sensor, an infrared sensor, and a GPS sensor.

Figure 3:
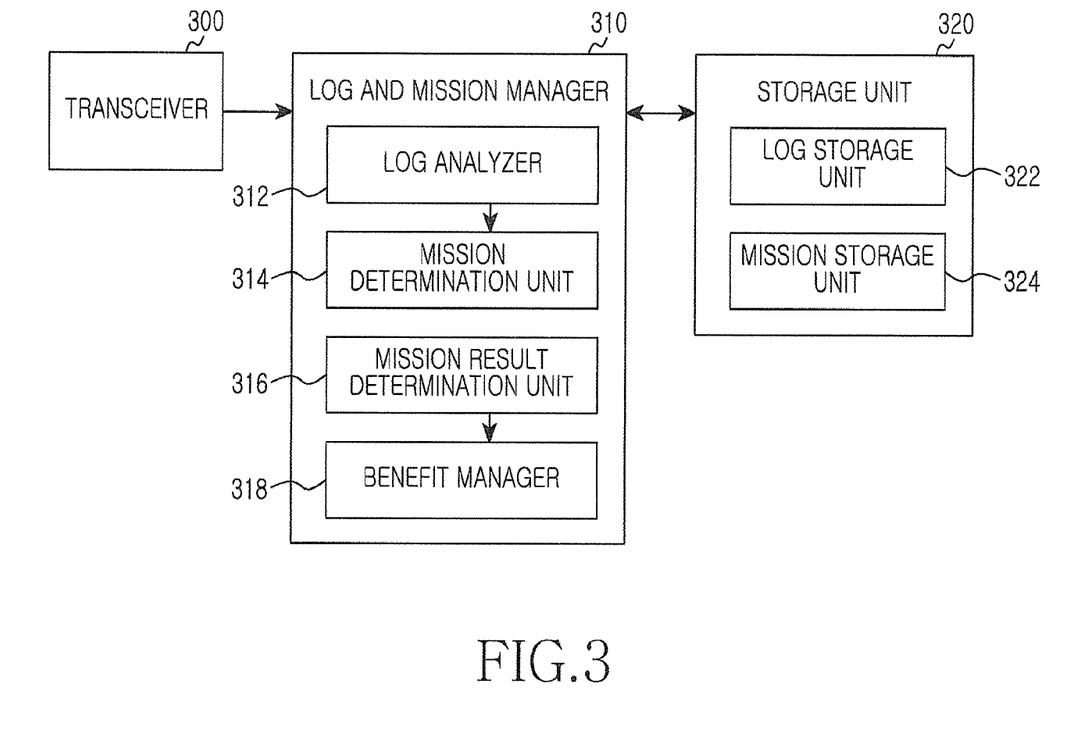
FIG. 3 is a block diagram illustrating a log-based mission manage server according to an embodiment of the present disclosure.

FIG. 3 is a block diagram illustrating a log-based mission manage server according to an embodiment of the present disclosure.

Referring to FIG. 3, the log-based mission manage server includes a transceiver 300, a log and mission manager 310, and a storage unit 320. More particularly, the log and mission manager 310 includes a log analyzer 312, a mission determination unit 314, a mission result determination unit 316, and a benefit manager 318.

The transceiver 300 processes a signal transmitted and received to and from a different apparatus under control of the log and mission manager 310. More particularly, the transceiver 300 transmits and receives a signal to and from a terminal or a mission franchise.

The log and mission manager 310 stores various missions regarding a mission franchise and a benefit for each mission in the storage unit 320, and collects user log data for each terminal to control and process a function for storing the collected user log data in the storage unit 320. Here, the mission may be a mission registered by the mission franchise, or may be a mission automatically generated by the log and mission manager 310 based on a characteristic of the mission franchise. In addition, the log and mission manager 310 may map user log data corresponding to each mission and store the mapped user log data and mission in the storage unit 320. At this point, the user log data mapped to each mission is general data obtained from a plurality of user log data, may be registered upon system designing, and may be updated based on user log data collected afterward.

In addition, when a signal representing a log-based customized service is used is received from a specific terminal, the log and mission manager 310 analyzes user log data collected in advance for the specific terminal, and then determines a mission corresponding to the analysis results among missions stored in advance to control and process a function for providing the determined mission to the specific terminal. In addition, the log and mission manager 310 receives a mission performance result from the specific terminal to determine whether the mission is successful, and controls and processes a function for transmitting results corresponding to whether the mission is successful to the specific terminal.

That is, when a signal representing the log-based customized service is used is received from the specific terminal, the log analyzer 312 collects and analyzes user log data corresponding to the specific terminal among user log data of respective terminals stored in the storage unit 320, and provides the analysis results to the mission determination unit 314.

After that, the mission determination unit 314 determines a mission corresponding to the analysis results among the missions stored in advance in the storage unit 320. That is, the mission determination unit 314 searches for and determines a mission mapped to user log data similar to the analysis results among the missions stored in the storage unit 320 to control and process a function for transmitting the mission to the specific terminal. Here, when the mission mapped to the user log data similar to the analysis results does not exist, the mission determination unit 314 may control and process a function for transmitting a message informing that the mission suitable for the relevant user does not exist to the specific terminal.

When mission performance results are received from the specific terminal, the mission result determination unit 316 analyzes the performance results to determine whether the specific terminal has successfully completed the mission. At this point, the mission result determination unit 316 may compare a performance result value for a relevant mission stored in the storage unit 320 with the mission performance result received from the specific terminal to determine whether the specific terminal has successfully completed the mission. When the specific terminal has not successfully completed the mission, the mission result determination unit 316 controls and processes a function for transmitting a message informing a mission failure to the specific terminal.

In contrast, when the mission result determination unit 316 determines that the specific terminal has successfully completed the mission, the benefit manager 318 controls and processes a function for transmitting a benefit corresponding to the mission the specific terminal has successfully completed to the specific terminal.

The storage unit 320 stores various programs and data for the overall operation of the log-based mission manage server. More particularly, according to an embodiment of the present disclosure, the storage unit 320 includes a log storage unit 322 to store user log data for each terminal, and includes a mission storage unit 324 to store various missions and benefit for each mission for a mission franchise. In addition, the mission storage unit 324 may store user log data for each mission, a mission performance result, or algorithm information for determining a mission performance result.

Figure 4:
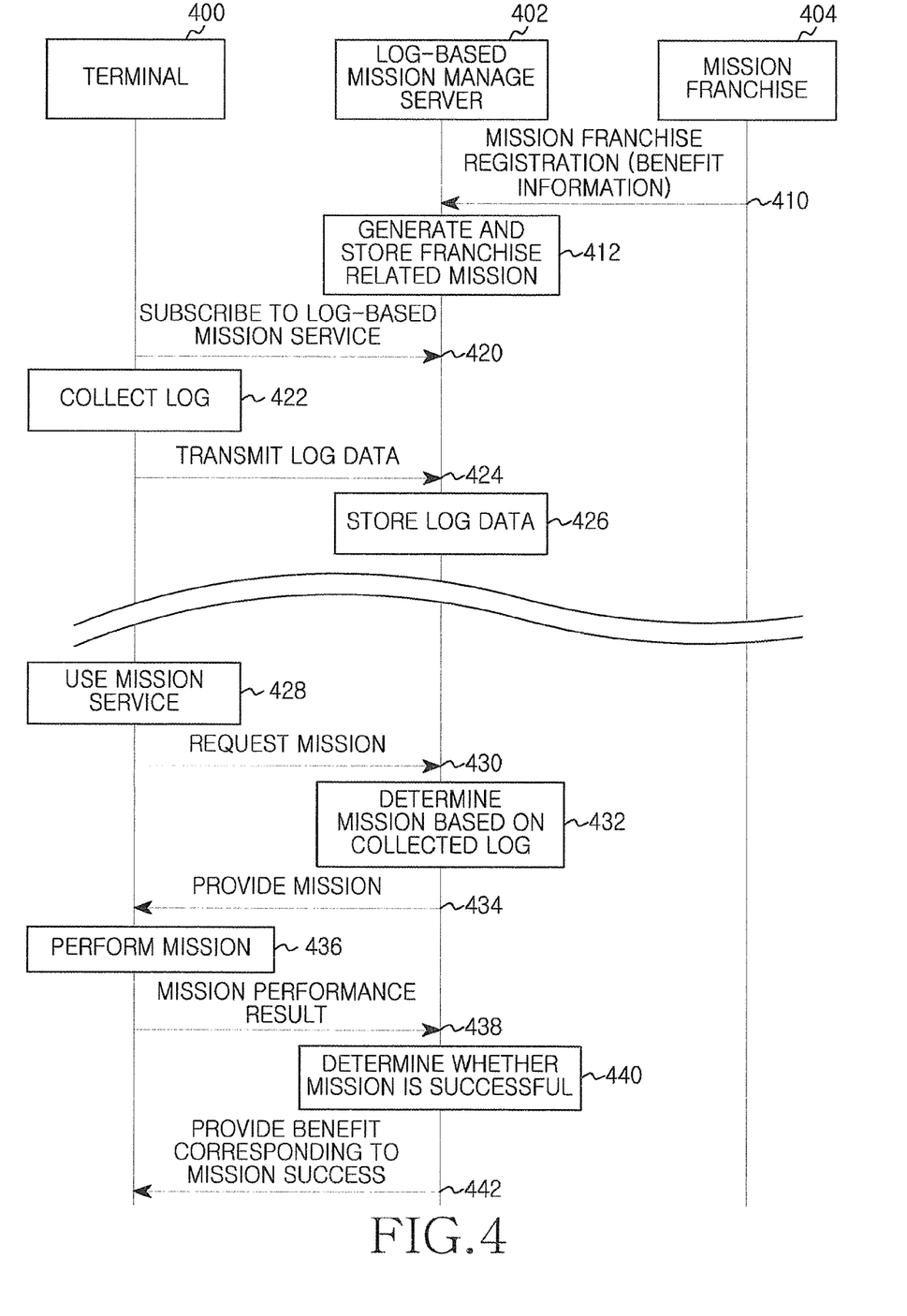
FIG. 4 is an illustration of a signal flow for providing a customized service based on a user log in a wireless communication system according to an embodiment of the present disclosure.

FIG. 4 is an illustration of a signal flow for providing a customized service based on a user log in a wireless communication system according to an embodiment of the present disclosure.

Referring to FIG. 4, a mission franchise 404 registers itself in a log-based mission manage server 402 in step 410. When the mission franchise 404 registers information regarding a benefit providable to each user, the log-based mission manage server 402 generates and stores a mission related to the registered franchise in step 412. At this point, the mission may be registered directly by the mission franchise 404, or may be generated directly by the log-based mission manage server 402 depending on a characteristic of the mission franchise 404. At this point, the log-based mission manage server 402 may map user log data corresponding to each mission and store the same. At this point, the mapped user log data may be general log data obtained from a plurality of user log data.

Meanwhile, the terminal 400 subscribes to a log-based mission service in step 420, detects and collects user log data in step 422, and transmits the collected user log data to the log-based mission manage server 402 in step 424. The log-based mission manage server 402 stores log data received from the terminal 400 in step 426.

The terminal 400 detects that a log-based mission service menu has been set through a user's key manipulation or touch operation in step 428, and transmits a mission request signal representing use of the log-based mission service to the log-based mission manage server 402 in step 430.

The log-based mission manage server 402 that has received the mission request signal analyzes a log collected in advance from the terminal 400 to determine a mission corresponding to the analyzed log in step 432, and provides the determined mission to the terminal 400 in step 434.

The terminal informs the user of a mission provided from the log-based mission manage server 402 to perform the provided mission under control of the user in step 436, and transmits the mission performance result to the log-based mission manage server 402 in step 438. At this point, the terminal 400 may automatically detect or manually detect completion of the mission under control of the user.

The log-based mission manage server 402 analyzes the mission performance result received from the terminal 400 to determine whether the terminal 400 has succeeded in performing the mission in step 440. Here, when determining the mission success, the log-based mission manage server 402 proceeds to step 442 to transmit benefit information corresponding to the mission success to the terminal 400. In contrast, when determining a mission failure, the log-based mission manage server 402 may transmit a signal representing the mission failure to the terminal 400 though not shown.

Figure 5:
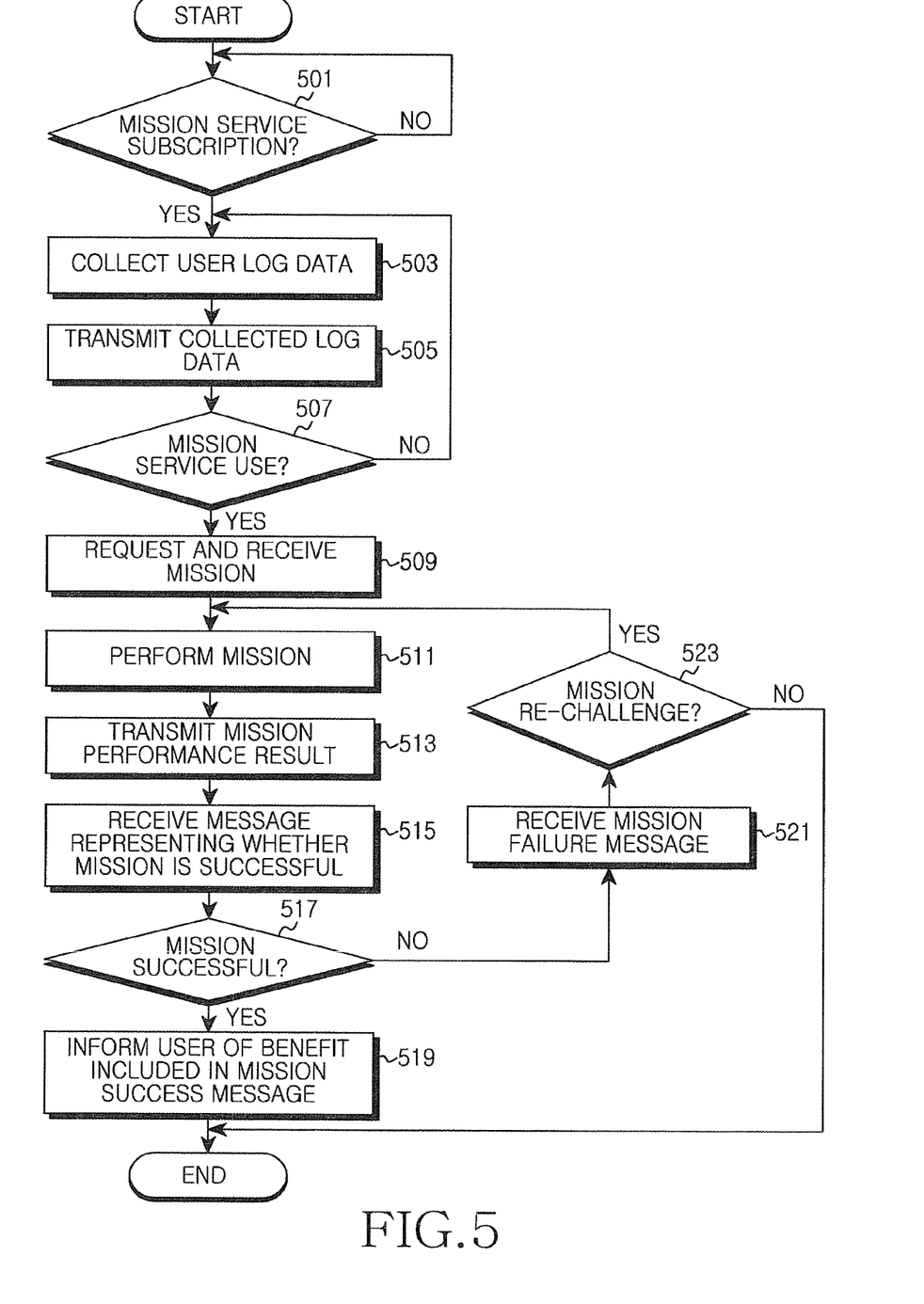
FIG. 5 is a flowchart illustrating a procedure for operating a terminal in a wireless communication system according to an embodiment of the present disclosure.

FIG. 5 is a flowchart illustrating a procedure for operating a terminal in a wireless communication system according to an embodiment of the present disclosure.

Referring to FIG. 5, the terminal determines whether the terminal subscribes to a log-based mission service in step 501. When the terminal subscribes to the log-based mission service, the terminal proceeds to step 503 to detect and collect data stored within the terminal and user log data via various sensors, and then transmit the collected log data to a log-based mission manage server in step 505. For example, the terminal may collect data such as photo/moving image related data, PIMS data, a contents use history, a voice memo, a text memo, location and time information, SNS related data, an E-mail/Internet use history, an electronic device use history, a communication record, a message record, etc. to transmit the collected data to the log-based mission manage server.

The terminal determines whether a menu for using a log-based mission service is set via the user's key manipulation or touch operation in step 507. When the menu for using the mission service is not set, the terminal returns to step 503 to re-perform subsequent steps.

In contrast, when the menu for using the mission service is set, the terminal requests the log-based mission manage server to transmit a mission and receives the mission in step 509.

The terminal informs the user of the received mission to perform the received mission under control of the user in step 511, and transmits the mission performance result to the log-based mission manage server in step 513. At this point, the terminal may automatically detect completion of the mission performance using data that occur inside the terminal or manually detect the completion of the mission performance according to the user's input. For example, when the mission is visiting a specific place, the terminal may determine whether a current position corresponds to the specific place via a GPS sensor to automatically detect completion of the mission performance, and transmit the current position to the log-based mission manage server. In contrast, when the mission is capturing a specific object, since the terminal has difficulty in determining whether a currently captured object is a mission object even when the terminal captures the specific object under control of the user, the terminal detects that the user selects a mission performance result report menu to detect completion of the mission performance, and may transmit the captured image to the log-based mission manage server.

The terminal receives a message representing whether the mission is successful in step 515, and analyzes the received message to determine whether the mission is successful or fails in step 517. When the received message represents a mission failure, the terminal proceeds to step 521 to inform the user of the mission failure, and displays a window that allows the user to select mission re-challenge in step 523. Here, when the user selects the mission re-challenge, the terminal returns to step 511. When the user does not select the mission re-challenge, the terminal ends the algorithm according to an embodiment of the present disclosure.

In contrast, when the received message represents the mission success, the terminal proceeds to step 519 to inform the user of a benefit included in the mission success message and ends the algorithm according to an embodiment of the present disclosure. At this point, the user may receive the benefit from the franchise.

Figure 6:
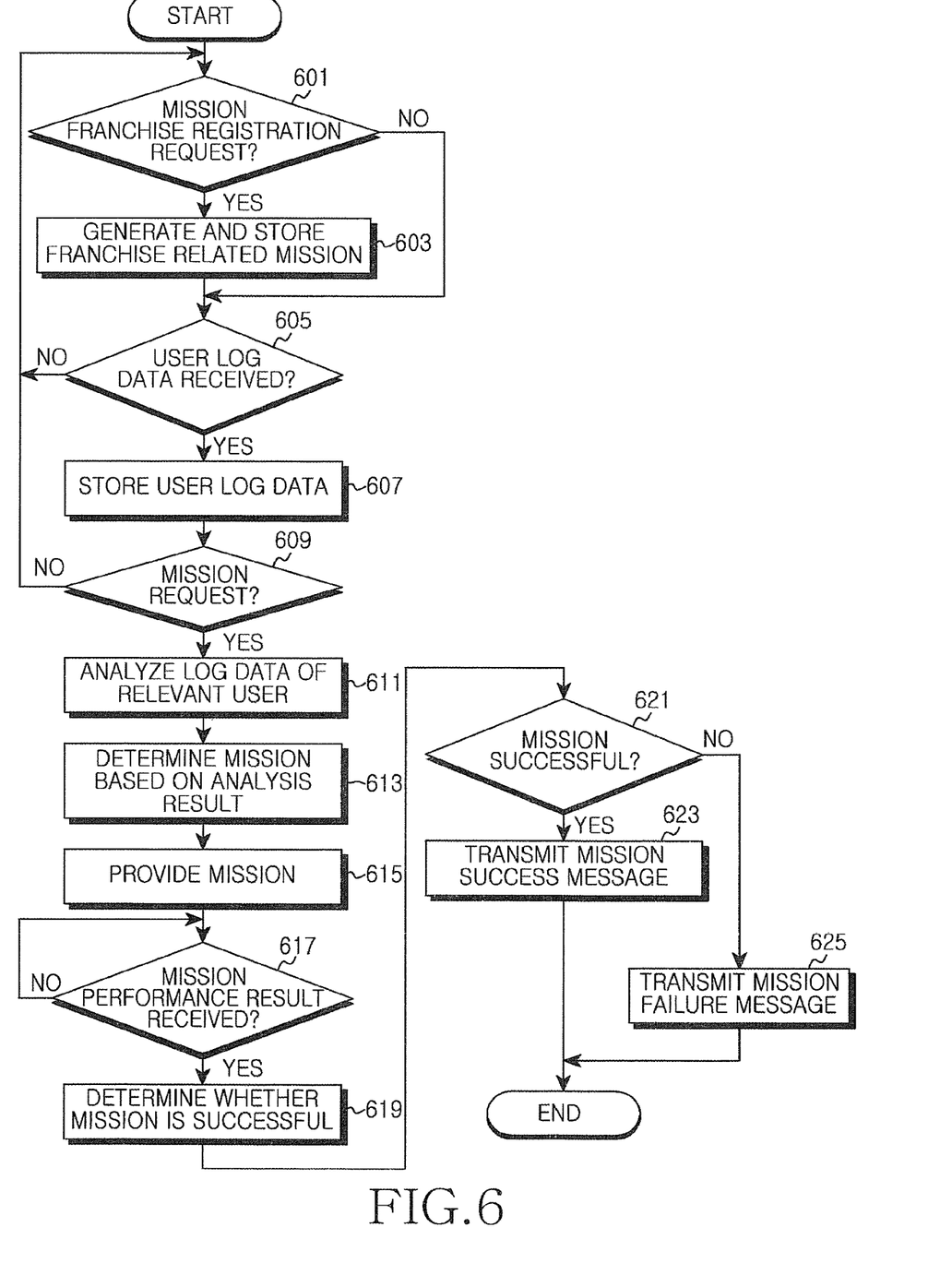
FIG. 6 is a flowchart illustrating a procedure for operating a mission manage server based on a user log in a wireless communication system according to an embodiment of the present disclosure.

FIG. 6 is a flowchart illustrating a procedure for operating a mission manage server based on a user log in a wireless communication system according to an embodiment of the present disclosure.

Referring to FIG. 6, the log-based mission manage server (referred to as a "mission manage server" hereinafter) determines whether a mission franchise registration is requested in step 601. When the mission franchise registration is not requested, the mission manage server proceeds to step 605. In contrast, when the mission franchise registration is requested, the mission manage server proceeds to step 603 to generate and store a mission related to the mission franchise that has requested registration. At this point, the mission may be registered directly by the mission franchise or may be generated directly by the mission manage server according to the characteristic of the mission franchise. In addition, the mission manage server maps and stores a benefit provided by a relevant mission franchise when storing the mission.

The mission manager server determines whether user log data is received from a terminal that has subscribed to the log-based mission service in step 605. When the user log data is not received, the mission manage server returns to step 601 to re-perform subsequent steps. When the user log data is received, the mission manage server stores the received user log data in step 607.

The mission manage server determines whether a mission is requested by the terminal that has subscribed to the log-based mission service in step 609. When the mission is not requested, the mission manage server returns to step 601 to re-perform subsequent steps. In contrast, when the mission is requested, the mission manage server proceeds to step 611 to analyze user log data corresponding to the terminal among user log data of each terminal stored in advance.

The mission manage server determines a mission to be provided to the terminal based on the analysis result in step 613. At this point, the mission manage server may determine a mission corresponding to the analysis result by mapping and storing user log data corresponding to each mission in advance. The mission manage server provides the mission to the terminal in step 615, and proceeds to step 617 to determine whether a mission performance result is received from the terminal. When the mission performance result is received, the mission manage server proceeds to step 619 to determine whether the mission is successful. When a mission failure is determined in step 621 as a result of determination of whether the mission is successful, the mission manage server proceeds to step 625 to transmit a message representing the mission failure to the terminal, and ends the algorithm according to an embodiment of the present disclosure. Of course, though not shown, when the mission performance result is received again from the terminal within a predetermined time after the mission manage server transmits the message representing the mission failure, the mission manage server proceeds to step 619 to perform subsequent steps.

In contrast, when a mission success is determined in step 621 as a result of determination of whether the mission is successful, the mission manage server proceeds to step 623 to transmit a mission success message including a benefit corresponding to the mission that the terminal has succeeded in performing to the terminal, and end the algorithm according to an embodiment of the present disclosure.

Based on the above description, an embodiment of the present disclosure is described using an example. The mission manage server may generate and store a mission and a benefit of "visit area A: provide coupon of franchise 1" with respect to a franchise "M" located at an area "A." After that, when the "area A" occurs more than a threshold frequency as a result of analysis of user log data of the terminal that has requested a mission, the mission manage server may provide a mission of "visit area A" to the terminal, and provide the coupon of franchise "1" when the specific terminal visits area "A."

For another example, the mission manage server may generate and store a mission and a benefit of "visit area A, B, or C: provide product S coupon" with respect to a franchise "1" that is located in areas "A," "B," and "C" and sells a product "S." After that, when product "S" is determined more than a threshold frequency and location information adjacent to area "B" is determined as a result of analysis of the user log data of a terminal that has requested a mission, the mission manage server may provide a mission of "visit the area B" to the terminal, and provide a coupon regarding product "S" provided by franchise "1" to the terminal when the terminal visits area "B."

For another example, the mission manage server may generate and store a mission and a benefit of "access to address A: provide product S coupon" with respect to a franchise "1" that has an Internet site having an address "A" and sells a product "S." After that, when data related to product "S" has been determined more than a threshold frequency as a result of analysis of user log data of a terminal that has requested a mission, the mission manage server may provide a mission of "access to address A" to the terminal and provide a product "S" coupon provided by franchise "1" to the terminal when the specific terminal accesses the Internet site of address "A."

Though the log-based mission manage server collects a user log and performs a function of generating and determining a mission corresponding to a franchise in the above description, the function of collecting the user log, generating and determining the mission may be performed by a separate server. That is, a log server that collects and manages a user log and a mission server that generates and manages a mission may be separately configured. At this point, the functions performed by the separately configured log server and mission server may be determined and changed within the scope of the present disclosure without departing from the spirit of the present disclosure.

In addition, though the log-based mission manage server collects and stores user log, and then analyzes the collected user log when a user's request exists to determine a suitable mission, a collected log may be analyzed and a suitable mission is determined in advance whenever the user log is collected, and then when a user request occurs, the mission determined in advance may be immediately provided.

Exemplary embodiments of the present disclosure provide an effect of providing a benefit to a user individual while creating a profit of an advertisement company by providing an apparatus and a method for providing a targeting advertisement service based on a user's life log in a wireless communication system.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An electronic device comprising:
   at least one sensor;
   a transceiver;
   a display; and
   at least one processor configured to:
      collect, over a time period, user log data comprising information on a plurality of localities visited by a user of the electronic device,
      control to transmit, through the transceiver, the user log data comprising the information on the plurality of localities, to a log manage server,
      based on a user input, control to transmit, through the transceiver to the log manage server, a signal for indicating a usage of a mission service provided by the log manage server,
      receive, through the transceiver from the log manage server, a mission corresponding to one locality of the plurality of localities that is determined based on a location of the electronic device, wherein the mission is determined from a plurality of missions, by the log manage server responsive to the signal, based on a number of times the user visited the one locality, the number of times being included in the information on the plurality of localities transmitted in the user log data to the log manage server,
      control to display, on the display, information of the received mission,
      control to detect, by the at least one sensor, sensory data associated with the mission being performed at the location of the electronic device corresponding to the one locality, and
      control to transmit, through the transceiver, the sensory data to the log manage server to determine whether a result of a performance of the mission is successful or not based on a correspondence between the mission and the sensory data,
   wherein the mission is at least one mission of a franchise registered with the log manage server.

2. The electronic device of claim 1, wherein the user log data further comprises at least one of photo data, video data, Personal Information Management System (PIMS) data, a contents use history, a voice memo, a text memo, time information, Social Networking System (SNS) related data, an electronic mail use history, an Internet use history, an electronic device use history, a communication record, data detected through the at least one sensor, or a message record.

3. The electronic device of claim 1, wherein the at least one processor is further configured to receive, through the transceiver, a compensation for the performance of the mission, from the log manage server, based on the result being successful.

4. The electronic device of claim 1, wherein the at least one processor is further configured to receive, through the transceiver, a message representing a mission performance failure from the log manage server, and determine whether to re-perform the mission.

5. The electronic device of claim 1, wherein the at least one processor is further configured to transmit the sensory data to the log manage server based on receiving a user input for transmitting the sensory data.

6. The electronic device of claim 1, wherein the signal for indicating the usage of the mission service comprises a request of the user of the electronic device to use the mission service for obtaining a compensation, to be received from the log manage server, upon a completion of the mission.

7. A server comprising:
   a transceiver;
   a storage; and
   at least one processor configured to:
      receive, through the transceiver, a signal for indicating a usage of a mission service and user log data from an electronic device, the signal being transmitted according to an input of a user of the electronic device, wherein the user log data comprises information on a plurality of localities visited by the user of the electronic device over a period of time,
      analyze the user log data to select a mission corresponding to one locality among the plurality of localities that is determined based on a location of the electronic device, wherein the mission is selected from a plurality of missions registered in the storage based on a number of times the user visited the one locality, the number of times being included in the information on the plurality of localities in the user log data,
      control to transmit, through the transceiver, the selected mission to the electronic device,
      receive, through the transceiver, sensory data associated with the mission, from the electronic device, the sensory data being detected by at least one sensor of the electronic device associated with the mission performed at the location of the electronic device corresponding to the one locality, and determine whether a result of a performance of the mission is successful or not using the received sensory data, based on a correspondence between the mission and the sensory data detected by the at least one sensor of the electronic device, wherein the mission is at least one mission of a franchise registered with the server.

8. The server of claim 7, wherein the user log data further comprises at least one of data, video data, Personal Information Management System (PIMS) data, a contents use history, a voice memo, a text memo, time information, Social Networking System (SNS) related data, an electronic mail use history, an Internet use history, an electronic device use history, a communication record, data detected through the at least one sensor of the electronic device, or a message record.

9. The server of claim 7, wherein the at least one processor is further configured to analyze the sensory data to determine whether the result is successful, and perform, based on a determination that the result is successful, a function for providing a compensation for the performance of the mission to the electronic device.

10. The server of claim 9, wherein the at least one processor is further configured to, based on a determination that the result is not successful, perform a function for transmitting a message representing a mission performance failure to the electronic device.

11. The server of claim 7, wherein the storage is configured to store a mapping of each of the plurality of missions to at least one from among the user log data and a compensation.

12. The server of claim 7, wherein the at least one processor is further configured to select the mission corresponding to the one locality based on number of times the user visited the one locality being greater than a predetermined threshold or being greater than a number of times the user visited other localities, respectively, among the plurality of localities, the other localities being different from, the one locality.

13. A method comprising:
collecting, by at least one processor of an electronic device, user log data comprising
information on a plurality of localities visited by a user of the electronic device over a time period;
transmitting the user log data comprising the information on the plurality of localities, to a log manage server;
based on a user input, transmitting, to the log manage server, a signal for indicating a usage of a mission service provided by the log manage server;
receiving a mission corresponding to one locality among the plurality of localities, wherein the mission is determined from a plurality of missions, by the log manage server responsive to the signal, based on a number of times the user visited the one locality, the number of times being included in the information on the plurality of localities transmitted in the user log data to the log manage server;
displaying, on a display of the electronic device, information of the received mission;
detecting, by at least one sensor of the electronic device, sensory data associated with the mission being performed at a location corresponding to the one locality; and
transmitting the sensory data to the log manage server to determine whether a result of a performance of the mission is successful or not, based on a correspondence between the mission and the sensory data,
wherein the mission is at least one mission of a franchise registered with the log manage server.

14. The method of claim 13, wherein the user log data further comprises at least one of photo data, video data, Personal Information Management System (PIMS) data, a contents use history, a voice memo, a text memo, time information, Social Networking System (SNS) related data, an electronic mail use history, an Internet use history, an electronic device use history, a communication record, data detected through the at least one sensor, or a message record.

15. The method of claim 13, further comprising:
receiving a compensation for the performance of the mission from the log manage server, based on the result being successful.

16. The method of claim 13, further comprising:
receiving a message representing a mission performance failure from the log manage server; and
determining whether to re-perform the mission.

17. The method of claim 13, further comprising:
based on receiving the user input, transmitting the sensory data to the log manage server.

18. A method comprising:
receiving, from an electronic device, a signal for using a mission service and user log data comprising information on a plurality of localities visited by a user of the electronic device, the signal being transmitted according to an input of the user of the electronic device;
selecting, by at least one processor of a server, a mission based on one locality among the plurality of localities, from a plurality of missions registered in a storage of the server;
transmitting the selected mission to the electronic device;
receiving sensory data associated with the mission, from the electronic device, the sensory data being detected by at least one sensor of the electronic device associated with the mission performed at a location corresponding to the one locality; and
determining whether a result of a performance of the mission is successful or not using the received sensory data, based on a correspondence between the mission and the sensory data detected by the at least one sensor of the electronic device,
wherein the mission is selected from the plurality of missions based on a number of times the user visited the one locality, the number of times being included in the information on the plurality of localities in the user log data,
wherein the mission is at least one mission of a franchise registered with the server.

19. The method of claim 18, wherein the user log data further comprises at least one of data, video data, Personal Information Management System (PIMS) data, a contents use history, a voice memo, a text memo, time information, Social Networking System (SNS) related data, an electronic mail use history, an Internet use history, an electronic device use history, a communication record, data detected through the at least one sensor of the electronic device, or a message record.

20. The method of claim 18, further comprising:
analyzing the sensory data to determine whether the result is successful; and
based on the determining that the result is successful, providing a compensation for the performance of the mission to the electronic device.

21. The method of claim 20, further comprising:
based on the determining that the result is not successful, transmitting a message representing a mission performance failure to the electronic device.

22. The method of claim 18, wherein each of the plurality of missions is mapped to at least one from among the user log data and a compensation.

* * * * *